United States Patent [19]

Newton et al.

[11] Patent Number: 4,460,233

[45] Date of Patent: Jul. 17, 1984

[54] TELEPHONE TERMINAL ASSEMBLY

[75] Inventors: Kenneth C. Newton, Danbury, Conn.; Robert P. Wallace, Katonah, N.Y.; Ernst Ohnell, Greenwich, Conn.

[73] Assignee: Programmed Marketing, Inc., Greenwich, Conn.

[21] Appl. No.: 424,049

[22] Filed: Sep. 27, 1982

[51] Int. Cl.³ .................................... H01R 13/506
[52] U.S. Cl. ............................. 339/122 R; 339/128
[58] Field of Search .............. 339/91 R, 122 R, 128, 339/126 R, 126 RS

[56] References Cited

U.S. PATENT DOCUMENTS

| 4,220,391 | 9/1980 | Krolak et al. | 339/126 R |
| 4,241,972 | 12/1980 | Ayer | 339/126 R |
| 4,370,013 | 1/1983 | Niitsu et al. | 339/91 R |
| 4,382,649 | 5/1983 | Meyer | 339/122 R |

FOREIGN PATENT DOCUMENTS 2000387 1/1979 United Kingdom ............... 339/128

Primary Examiner—John McQuade
Attorney, Agent, or Firm—Mark T. Basseches; Paula T. Basseches

[57] ABSTRACT

The present invention is directed to a telephone terminal assembly of the type adapted to receive the standard connector plug of a conventional telephone. The device is characterized by the receptor socket for the telephone plug being snap-fittedly mountable in the terminal, the device including locking means for preventing the snap-fitting components from being outwardly deflected, with resultant possible removal of the socket from the terminal device. Preferably the locking means comprises connector terminals emplanted in the base portion of the terminal assembly.

3 Claims, 5 Drawing Figures

TELEPHONE TERMINAL ASSEMBLY

BACKGROUND OF THE INVENTION

1. Field of the Invention

The present invention is in the field of telephone interconnect devices and pertains more particularly to a terminal to which the incoming telephone wires are connected and which is adapted to receive the conventional male telephone plug.

2. The Prior Art

Telephone instruments are typically equipped with a male plug member having four or more leads directed to the telephone apparatus. A wall mounted terminal receives incoming leads. The terminal includes a standard female socket member into which the plug of the telephone may be inserted, enabling facile connection and disconnection of a telephone instrument.

In devices heretofore known, the mounting of the socket to the terminal member has been a labor intensive operation. Mounting means heretofore known have included the formation of a glued connection between the socket and terminal shell or the provision of ultrasonic welds between the noted components.

The glued connection has been subject to failure in the event that a pulling force is exerted on the telephone cord.

While the ultrasonic connection has formed a dependable bond between the socket and the base of the terminal, the expense of effecting such connection has greatly increased the cost of fabrication.

In an alternate means of securing the socket to the base of the terminal, it has been suggested to employ a snap-fitting interconnection between the socket and deflectible components of the base proper. However, the same resiliency which permits initial assembly of the parts provides a means whereby the socket may be displaced from the base through the application of pressures against the male plug.

SUMMARY OF THE INVENTION

The present invention may be summarized as directed to an improved terminal assembly providing access for the connection thereto of the male plug of a telephone apparatus. The device is characterized by the provision of a snap-fitting connection between the female socket and a pair of outwardly deflectible fingers formed integral with the base of the assembly.

Preferably the fingers include leading cam surfaces whereby the fingers are spread responsive to insertion of the socket, the fingers including locking or detenting shoulders which snap behind the socket after the latter is positioned.

A characterizing feature of the device resides in the provision of locking members mounted to the base after insertion of the socket, while locking members engage against the fingers and preclude the fingers from being resiliently deflected responsive to forces exerted against the socket.

Preferably the locking members are comprised of terminals to which the incoming telephone wires are connected.

It is accordingly an object of the present invention to provide an improved telephone terminal assembly;

A further object of the invention is the provision of a device of the type described wherein the telephone socket is mounted to the base of the terminal by a snap-fit connection, which connection is rendered permanent, i.e. wherein the deflectible components are rigidified against return deflection, by terminal portions embedded in the body of the base in positions adjacent the deflectible components in positions to block retro-deflection.

To attain these objects and such further objects as may appear herein or be hereinafter pointed out, reference is made to the accompanying drawings, forming a part hereof, in which.

Figure 1:
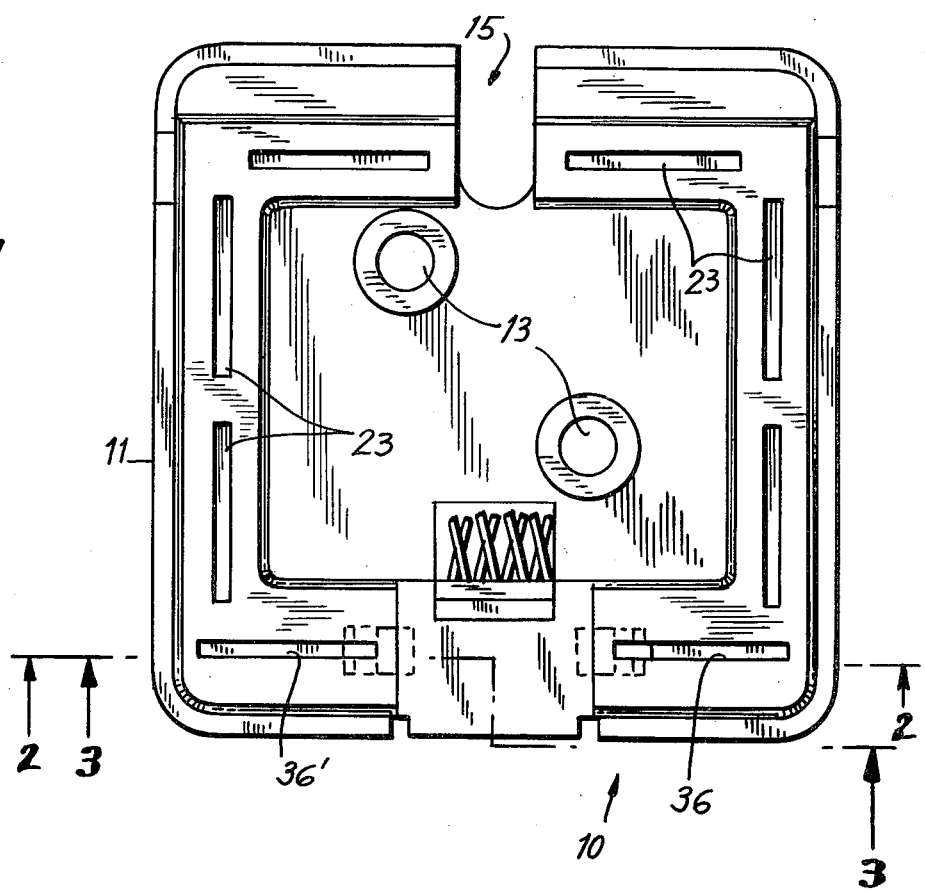
FIG. 1 is a top plan view of a device in accordance with the invention with the covering shell removed.

Referring now to the drawings, there is shown in FIG. 1 a view of the base portion 10 of a telephone interconnect device, the base portion being molded of a resilient polymeric insulating material. As will be understood, the base portion 10 includes a perimetal upstanding wall portion 11 and a back or bottom portion 12 which, in use, will be mounted against a wall, floor or like planar surface as by screws or other fasteners passed through mounting apertures 13. In use, a cover member 14 is snapped or otherwise removably fitted over the wall portion 11 to cover the wiring within the device.

An access channel 15 is provided for the incoming telephone wires. Such wires are electrically connected to a series of internal conductor members 16, known per se. Illustratively, the conductor members 16 comprise metal stampings having two upstanding bifurcate attachment members 17 connected at their base end by a bridging portion 18.

For effecting an electrical connection to the members 16, a wire (not shown) is fed into the gap 19 between the legs 20, 21 of the bifurcate attachment members 17 and pressed downwardly, whereupon the sharpened metallic portions slice through the insulation of the wires and the conductive portions of the wires are clamped in the nip 22 between the legs 20, 21. The described attachment of the wires to the terminals 16 may be effected by an attachment tool (not shown) known per se.

As hereinabove noted, the terminals or stampings 16 are conventional and a description thereof is made only for the purpose of facilitating an understanding of the construction and functioning of the instant terminal device.

The stampings 16 are frictionally embedded in slots 23 formed in the base portion 10.

A principal advance of the instant invention resides in the utilization of two of the several terminal members 16, namely the members 16', 16', to serve not only the electrical connecting function described above but also a locking function which permanently effects connection of the socket member 24 to the base 10 without necessitating the use of glueing or sonic welding steps and without the insecurity inherent in conventional snap-in connections between the socket member and the base.

To this end, the base member 10, and particularly the bottom portion 12 thereof, is formed with a downwardly facing aperture 25 leading to an internal recess within the base member. The side wall portions of the recess are defined by deflectible fingers 26, 26'. Since the fingers 26, 26' are identical, a description of one will suffice.

The finger 26, on its inner or recess defining surface, includes an inwardly directed cam surface 27 leading to a locking shoulder 28.

Figure 2:
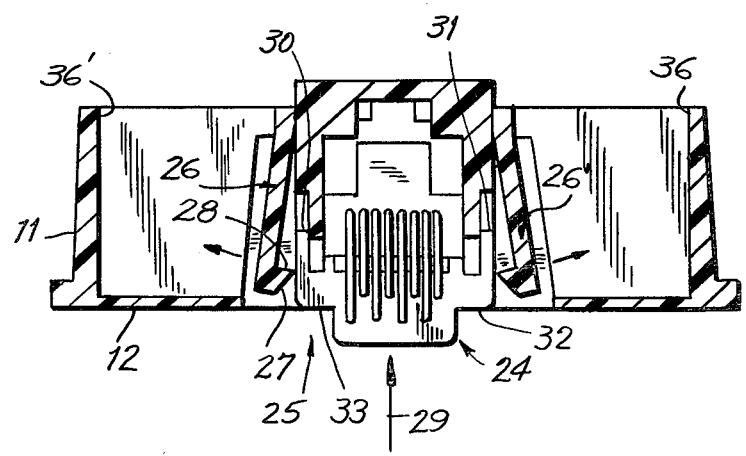
FIG. 2 is a vertical section taken on the line 2—2 of FIG. 1 showing the position of the parts in a partially assembled condition of the socket to the base.
Figure 3:
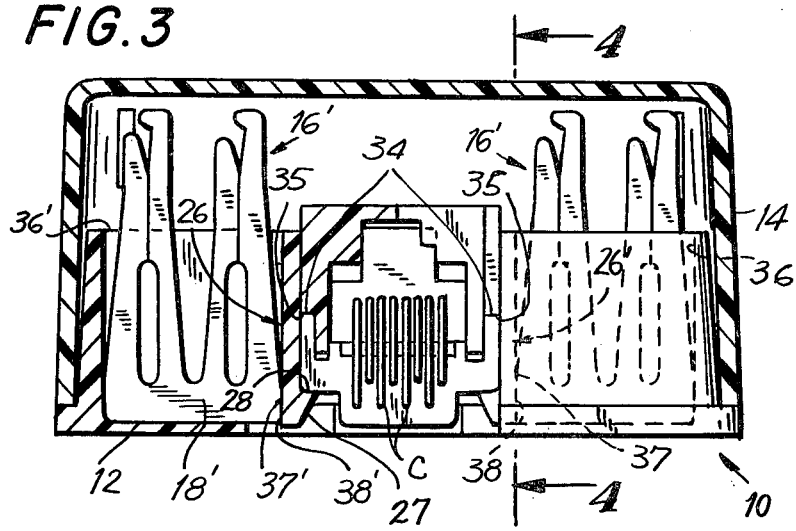
FIG. 3 is a discontinuous section taken on the line 3—3 of FIG. 1 showing the parts assembled and a covering shell in position.
Figure 4:
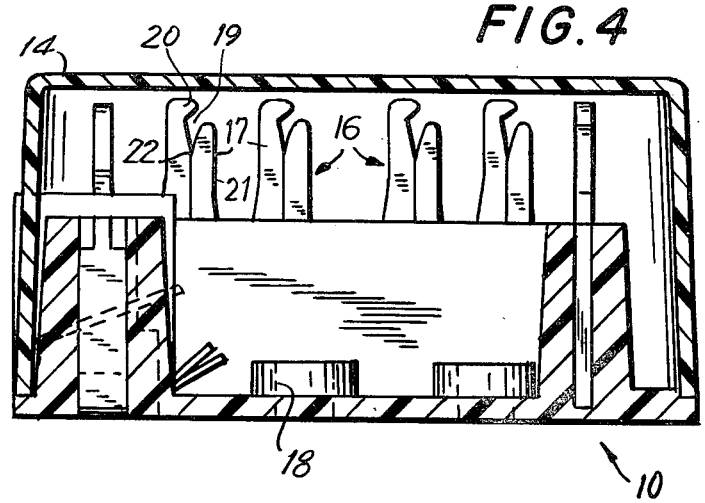
FIG. 4 is a section taken on the line 4—4 of FIG. 3.
Figure 5:
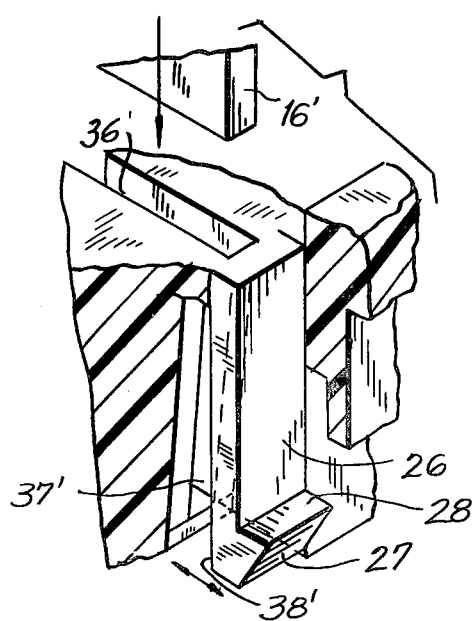
FIG. 5 is a magnified fragmentary perspective view illustrating details of the socket mounting structure.

As best seen in FIGS. 2 and 3, the finger 26 will normally lie in the position shown in FIG. 5 wherein it is perpendicular to the bottom wall 12. The fingers 26, 26' are deflectible outwardly and such deflection will occur when the socket 24 is forced upwardly through the opening 25 in the direction of the arrow 29, FIG. 2.

When such upward movement occurs, lead shoulder portions 30, 31 will engage against the cam surfaces 27 of the fingers, inducing a spreading movement thereof, as clearly shown in FIG. 2.

When the socket 24 reaches its fully inserted position, as shown in FIG. 3, the fingers 26, 26' will snap inwardly, whereby the locking shoulders 28 of the fingers enter behind trailing shoulder portions 32, 33 formed on the socket 24. The socket is now encompassed within the base portion 10 and held in such position by the interengagement of the locking shoulders 28 of the respective fingers with the trailing shoulders 32, 33 of the socket.

In the inserted position shown in FIG. 3 it will be perceived that stop shoulders 34, 34 of the socket engage against complemental stop portions 35, 35 on the base, limiting inward movement of the socket.

From the above description it will be apparent that the socket is snap-fittedly connected to the base. It will be further understood, however, that if a sufficient outward or canting force is exerted on the socket, as would be the case, for instance, if a telephone line connected to the socket were suddenly tugged, the fingers 26, 26' might be caused to flex outwardly and the socket snapped clear of its connection with the base.

In order to prevent this possibility and to assure that the socket is fixedly located within the base with a permanence at least equivalent to a sonic welded connection, the terminal members 16' are caused to interact with the fingers to prevent such outward deflection.

More particularly, and with reference to FIGS. 3 and 5, the base member 10 adjacent the aperture 25 immediately outwardly of the terminal members 16' is provided with a pair of terminal slots 36, 36'. The transverse extent of the slots 36, 36' is such that the same open inwardly as at 37, 37' adjacent the outer face 38, 38' of the terminal members 16'.

It will thus be seen, with particular reference to FIG. 3, that after insertion of the terminal members 16', the fingers 26, 26' are no longer free to deflect outwardly due to the interaction of the terminal members 16' with the fingers 26, 26'. Since the fingers are no longer free to deflect outwardly, the socket 24 is permanently captured in the mounted position shown in FIG. 3.

As will be evident from the preceding description, the terminal members 16' serve the double function of providing a connection means (via jumper wires (not shown) extending between the contacts C, for example, of the socket and the terminals 16', and also a locking means to assure the permanent disposition of the socket in the base portion.

It will thus be apparent to those skilled in the art that there is provided a telephone terminal device wherein the socket or female connector member for receiving the male plug of the telephone is effectively and permanently secured to the base of the connector apparatus without resort to such labor intensive methods as cementing or ultrasonic welding.

The parts of which the terminal member is comprised are snap-fittedly connected, i.e. the socket is snapped into position in the base and the terminal members are jammed or frictionally mounted into appropriately formed and positioned slots in the base.

The noted operations are well suited to automated procedures, greatly reducing the necessity of reliance upon manual assembly steps.

As will be apparent to those skilled in the art who are familiarized with the instant disclosure, numerous variations in details of construction may be made without departing from the spirit of the invention. Accordingly, the same is to be broadly construed within the scope of the appended claims.

Having thus described the invention and illustrated its use, what is claimed as new and is desired to be secured by Letters Patent is:

1. A telephone interconnect device comprising a base portion of resilient polymeric material and a cover member removably mounted thereover, said base portion including an aperture, a pair of resiliently deflectible finger members integrally formed on said base portion, one said finger member being disposed on each side of said aperture and defining a boundary thereof, said finger members including opposed cam surfaces converging in a direction toward the interior of said device and inwardly facing opposed detent portions in trailing position relative to said cam portions, a separable socket member retained in said aperture, said socket member including spaced lead shoulders positioned to engage said cam surfaces and outwardly deflect said finger members responsive to movement of said socket member into said aperture and outwardly facing locking shoulder portions, said detent portions of said fingers, in the inserted position of said socket member, outwardly lapping said locking shoulder portions of said socket member, thereby to limit outward movement of said socket member from said aperture, complemental stop portion means on said base portion and socket member limiting inward relative movement of said socket member and base portion, and at least two separable locking members mounted on said base portion at opposite sides of said aperture, said locking members being positioned adjacent surfaces of said fingers opposite said aperture to lock said fingers against outward deflecting movements whereby said socket member is fixedly secured in said aperture.

2. A device in accordance with claim 1 wherein said locking members comprise terminals.

3. Apparatus in accordance with claim 2 wherein said base portion includes receptor slots fixedly receiving said terminals, said receptor slots being open in the direction of said fingers whereby portions of said terminals abut said fingers to limit spreading movements of said fingers.

* * * * *